(12) United States Patent
Mejia et al.

(10) Patent No.: US 8,219,053 B2
(45) Date of Patent: Jul. 10, 2012

(54) AUTOMATIC TUNING READER

(75) Inventors: Ezequiel Mejia, Woodbury, MN (US); Yuri Smirnov, Eagan, MN (US)

(73) Assignee: Destron Fearing Corporation, South St. Paul, MN (US)

( * ) Notice: Subject to any disclaimer, the term of this patent is extended or adjusted under 35 U.S.C. 154(b) by 710 days.

(21) Appl. No.: 12/254,241

(22) Filed: Oct. 20, 2008

(65) Prior Publication Data

US 2009/0102607 A1    Apr. 23, 2009

Related U.S. Application Data

(60) Provisional application No. 60/981,290, filed on Oct. 19, 2007.

(51) Int. Cl.
*H04B 17/00* (2006.01)
(52) U.S. Cl. .............. 455/193.1; 455/114.1; 455/115.1; 455/69; 455/121; 455/123; 455/65
(58) Field of Classification Search ............... 455/62, 455/63.1–65, 69, 114.1, 115.1, 121–123
See application file for complete search history.

(56) References Cited

U.S. PATENT DOCUMENTS

| | | | |
|---|---|---|---|
| 5,155,547 A | | 10/1992 | Casper et al. |
| 5,541,604 A | * | 7/1996 | Meier ........................... 342/42 |
| 5,714,885 A | | 2/1998 | Lulham |
| 6,070,803 A | | 6/2000 | Stobbe |
| 6,122,492 A | * | 9/2000 | Sears ........................ 455/127.1 |
| 6,317,027 B1 | | 11/2001 | Watkins |
| 7,256,695 B2 | | 8/2007 | Hamel et al. |
| 2007/0206701 A1 | * | 9/2007 | Paley et al. ................... 375/295 |

OTHER PUBLICATIONS

International Search Report dated Dec. 19, 2008, filed by Blaine R. Copenheaver; 3 pgs.
Supplementary Search Report issued on Jan. 30, 2012 in the corresponding European Appln. No. 08840391.0.

* cited by examiner

*Primary Examiner* — Edward Urban
*Assistant Examiner* — Stacey Sorawat
(74) *Attorney, Agent, or Firm* — Stroock & Stroock & Lavan LLP

(57) ABSTRACT

A system and method of automatically tuning a reading device that remotely monitors RFID tags or transponders. The reading device utilizes the phase signal of an antenna signal wherein the harmonic of the antenna signal is filtered through a signal coupling transformer and utilizes the antenna current reading to determine the optimal capacitance setting for the reader by adjusting capacitors and storing the relative phase signal and level of current in a processor. In one embodiment, the method comprises supplying power to the reading device, monitoring the power supply, storing data related to the monitored power supply, emitting a signal from an antenna, filtering the harmonic of such signal, outputting the phase signal to a processor and adjusting capacitors based on the phase signal and monitored current.

16 Claims, 5 Drawing Sheets

AUTOMATIC TUNING READER

CROSS-REFERENCE TO RELATED APPLICATIONS

This application claims priority to U.S. Provisional Patent Application Ser. No. 60/981,290, filed on Oct. 19, 2007, entitled Automatic Tuning Reader, which is incorporated herein by reference.

FIELD OF THE INVENTION

The present invention generally relates to automatically tuning a device reader and more specifically to a system and method for autotuning a device reader that remotely monitors an RFID tag or transponder that can be attached for example to a person, animal or an object within a three-dimensional area.

BACKGROUND OF THE INVENTION

The use of Radio Frequency Identification ("RFID") technology and specifically RFID tags is well known in the art. In practice, RFID tags contain an integrated circuit and are typically attached to animals persons or other objects to monitor their whereabouts. A passive RFID tag typically has no internal power supply. Rather, the RFID tag is able to pick up minute magnetic fields that are generated by an antenna which provides enough power for the integrated circuit in the RFID tag to power up and transmit a response. Typically, when RFID tags are used, a reader that has an antenna is placed in proximity to where the RFID tags are to be read and the reader antenna emits a magnet field which is then received by and powers the RFID tag to return a signal to the antenna. In the past, problems have arisen when a reader is used to monitor RFID tags because the reader is typically located outdoors near metal structures which may affect the optimal tuning. In order to overcome the above deficiencies in the prior art, a system and method is needed to "automatically" tune a reader to its optimal settings so as to more efficiently monitor and track RFID tags.

SUMMARY OF THE INVENTION

These and other needs are satisfied by the embodiments disclosed herein. In general, embodiments described herein disclose a system and method of automatically tuning a reading device that remotely monitors RFID tags or transponders. In one embodiment of the present invention, the reading device generally comprises a current monitor for monitoring the current received from a power supply; an antenna driver, one or more capacitors, one or more switches for controlling the one or more capacitors, a processor with a memory component, an antenna, and a signal coupling transformer, wherein the signal coupling transformer filters the harmonic level of an antenna signal retrieved from the antenna, outputs the phase signal of said antenna signal to the processor and the processor stores data related to such phase signal and data related to the monitored current in said memory and sends a signal to the one or more switches to adjust the one or more capacitors to automatically tune the reading device based on the stored data.

In one embodiment of the present invention, the method of automatically tuning a reading device generally comprises supplying power to the reading device, monitoring the power supply, storing data related to the monitored power supply in a memory component of the processor, emitting a signal from the antenna, receiving the antenna signal in a signal coupling transformer, filtering a harmonic of the antenna signal in the signal coupling transformer, outputting the phase signal of the antenna signal to the processor, storing data related to the phase signal in a memory component of the processor, adjusting capacitors that are in communication with the antenna, and tuning the capacitors to the optimal setting based on the data stored in the processor.

BRIEF DESCRIPTION OF THE DRAWINGS

The present invention can be better understood by reference to the following drawings, wherein like reference numerals represent like elements. The drawings are merely exemplary to illustrate certain features that may be used singularly or in combination with other features and the present invention should not be limited to the embodiments shown.

DETAILED DESCRIPTION OF PREFERRED EMBODIMENTS

An automatic tuning reader and a method for autotuning a reader used with an RFID device or transponder is described and explained herein. In the following description, for purposes of explanation, certain components, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention.

Certain embodiments will now be discussed with reference to the aforementioned figures, wherein like referenced numerals will refer to like components. It should be noted that references in the specification to phrases such as "one embodiment" or "an embodiment" means that a particular feature, structure or characteristic described in connection with the embodiment is included in at least one embodiment. The appearances or phrases such as "in one embodiment" in various places in the specification are not necessarily, but can be, referring to the same embodiment.

Figure 1:
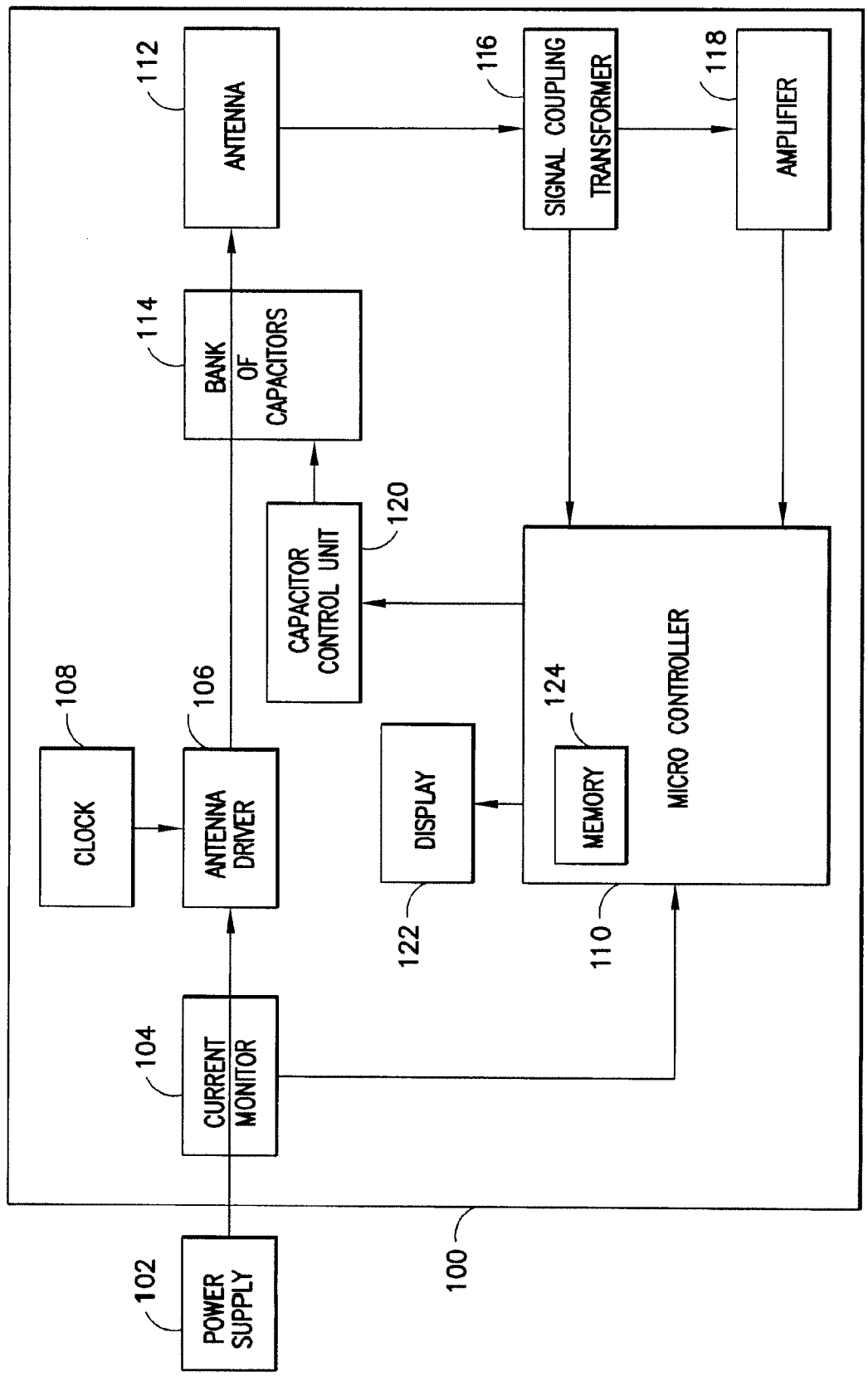
FIG. 1 is a general schematic overview of an auto tuning reader according to one embodiment of the present invention.

As can be seen in FIG. 1, a reader 100 according to one embodiment of the present invention is shown. In general reader 100 can be used to emit a signal and preferably communicate with an RFID tag or transponder. Reader 100 is typically designed to be placed in proximity to where RFID tags may be found so as to track or monitor such tags' movement and location.

Reader 100 comprises a power supply 102 which supplies power to device 100. Power supply 102 is preferably an AC to DC power converter, and the output of power source 102 is preferably a DC voltage of approximately 12 volts to 24 volts. Reader 100 also comprises current monitor 104, which measures and monitors the current that is received from power supply 102. The power supply current flows through current monitor 104 and into antenna driver 106. Additionally, the output from current monitor 104 is fed into micro controller 110 which will be discussed in more detail below. As can further be seen in FIG. 1, the antenna driver 106 is also connected to an oscillator clock 108 which clock is preferably set to 134.2 KHz. The antenna driver 106 drives the antenna 112 to allow the antenna to generate a signal or magnetic field that can then provide power to the RFID tags. Additionally, between antenna 112 and antenna driver 106 is a bank of capacitors 114. The bank of capacitors are controlled by capacitor control unit 120 which is preferably an array of switches that can provide or reduce capacity to the antenna 112 by activating and deactivating the capacitors in order to automatically tune the reader 100 as discussed in more detail below. Additionally, the reader preferably comprises a signal coupling transformer 116 and an amplifier 118.

The micro controller 110 can be any processor that is capable of receiving and storing data and signals such as a Central Processing Unit (CPU) and the like. Additionally, the micro controller 110 also comprises a storage component such as memory 124, for storing data related to the received signals and a display 122 such as a monitor or LCD panel which can be viewed by the user of the reader.

Figure 2:
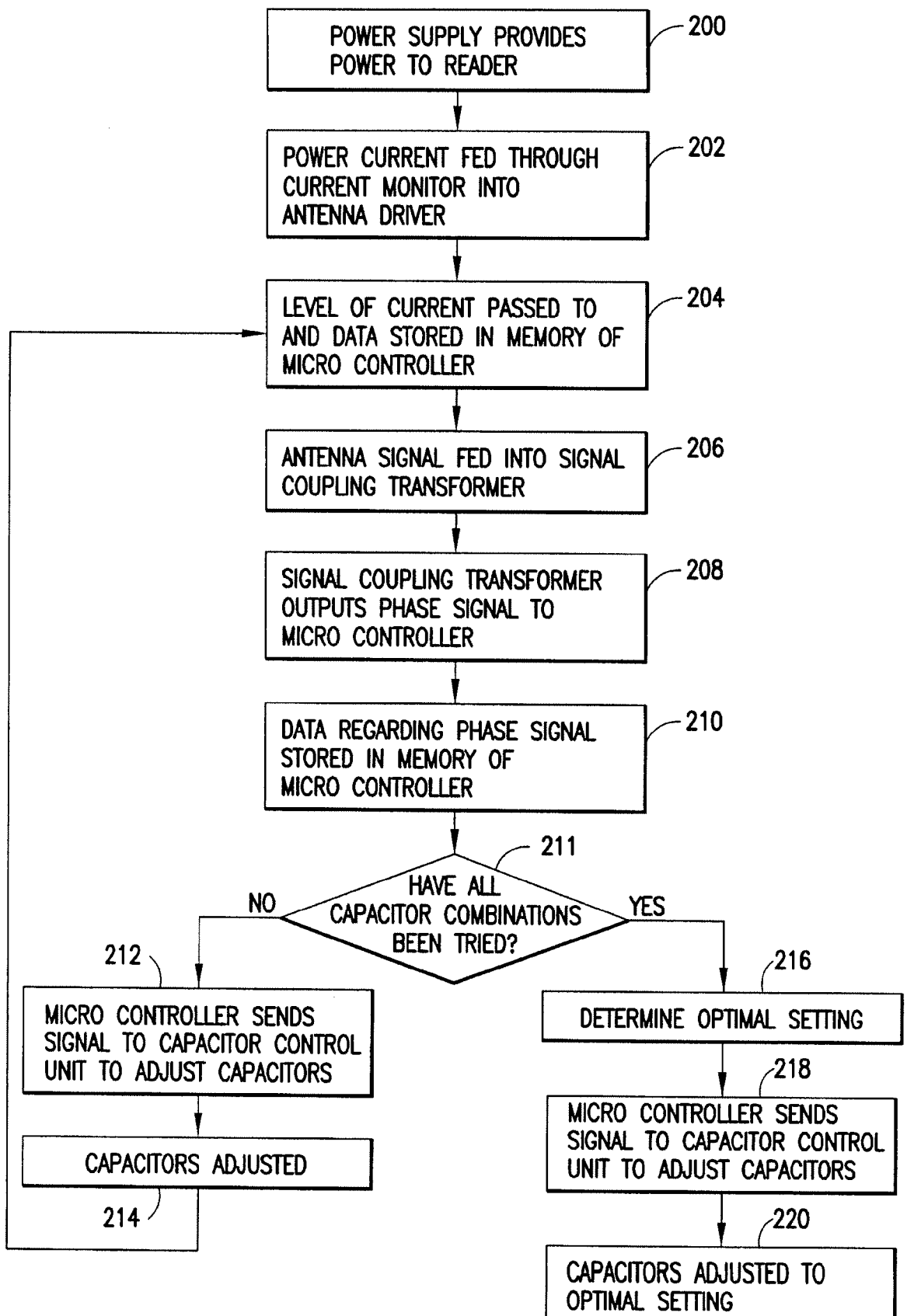
FIG. 2 is a flowchart depicting the auto tuning process according to one embodiment of the present invention.

In one embodiment of the present invention, as can be seen in FIG. 2, when the reader 100 is started up, the power supply 102 provides power to the reader. Step 200. The power current is then fed through the current monitor 104 into the antenna driver 106 which provides the antenna 112 with power to emit a signal. Step 202. Additionally, the level of current is passed from the current monitor 104 to the micro controller 110 and data above the level of current stored in memory 124. Step 204. The antenna signal is then fed into signal coupling transformer 116. Step 206. Signal coupling transformer 116 is preferably adjusted to a value between 260-500 KHz and more preferably to approximately 402.6 KHz which allows the signal coupling transformer to filter out the other parts of the signal and only process the signal's harmonic signal. The set-up and adjusting of signal coupling transformer 116 can take place at the time the reader is assembled and tested or can be manually adjusted once the reader is already functioning. As discussed in more detail below, use of a signal's harmonic portion rather than the carrier frequency reduces the amount of high voltage parts necessary to read such signal and also contributes to the reduction of noise that may result in signal loss. The below example will be discussed in terms of reading the signal at or near its third harmonic or nearly 402.6 KHz, but it should be appreciated that any harmonic level can be used without departing from the scope of the invention.

The signal coupling transformer 116 passes the signal from the antenna 112 and outputs the phase signal of the antenna to micro controller 110. Step 208. Micro controller 110 receives the phase signal from signal coupling transformer 116 and the current signal from current monitor 104 and stores data about them in its memory 124. Step 210. Once micro controller 110 has stored the data related to the antenna phase signal and the current, the micro controller 110 determines if all of the capacitor combinations have been attempted. Step 211. As will be discussed below, the capacitors in capacitor bank 114 can be adjusted to add or reduce capacitance by turning on or off a specific capacitor through capacitor control unit 120. For example, a bank of six capacitors can be set individually to produce $2^6$ difference capacitor values. This is preferably determined by use of an algorithm or manual adjustment of the capacitors as discussed in more detail below. If all capacitor combinations have not been tried, micro controller 110 sends a signal to capacitor control unit 120 to adjust the capacitors in the bank of capacitors 114 to either add or reduce capacity. Step 212. The bank of capacitors 114 can provide varying amounts of capacitance based on which capacitors are enabled or disabled. Upon receiving the signal from micro controller 110, the capacitor control unit adjusts the capacitors. Step 214.

Once the capacitors have been adjusted, antenna 112 once again generates a signal which output is read by signal coupling transformer 116 and the phase signal of the harmonic of such signal is fed to micro controller 110 and data related to that signal is stored in memory 124. Additionally, it should be appreciated that the adjustment of the capacitors adjusts the level of current which is fed from current monitor 104 into micro controller 110 data about which current level is also preferably stored in memory 124. As above, micro controller 110 determines if all capacitor combinations have been attempted and if not, micro controller 110 sends a signal to capacitor control unit 120 to readjust the bank of capacitors 114. Upon receiving the signal, capacitor control unit 120 adjusts the capacitors which causes the antenna to emit a signal and such signal is input to signal coupling transformer 116. This process is repeated until each combination of capacitors being activated is reached. If the micro controller determines that all the combinations of capacitors have been tried, the micro controller 110 determines the optimal capacitor combination based on the phase signal received and optimal level of current. Step 216. The micro controller then sends a signal to the capacitor control unit 120 to adjust the bank of capacitors 114 to the optimal setting. Step 218. The capacitors are then adjusted to their optimal setting. Step 220. Thus the reader 100 is tuned appropriately to be able to communicate with the RFID tags. It should be noted that this autotuning of the reader 100 can be performed when the reader 100 is started up or can be performed at a certain interval after the reader is powered up, (e.g., once a day).

Once the reader 100 has been autotuned, the antenna 112 is emitting its signal at an optimal capacitance. In one embodiment, reader 100 is placed in a location that a user wants to monitor. For example, if a user wants to monitor animals that are tagged with RFID tags and track whether any of such animals has entered a barn area for instance, the reader would be affixed at the entrance to a barn area. Once the reader 100 has been auto tuned as discussed above, the antenna 112 emits a magnetic field. If an RFID tag enters the magnetic field that the antenna 112 has emitted, it will be activated, (e.g., it will create a power source to turn on the chip therein), and the RFID tag will emit a signal which modulates the magnetic field created by the antenna signal. The signal from the RFID tag will typically be weaker than the signal emitted by the antenna and when combined with the antenna signal will create a modulation to the magnetic field created by the antenna signal. In addition to receiving the antenna signal, the signal coupling transformer 116 receives the signal emitted from the RFID tag which is then preferably fed through amplifier 118 and into micro controller 110. When micro controller 110 receives this additional signal or change in signal, it is able to output to a user an indication that an RFID tag has been detected in the monitored area. Based on the signal received it can be determined which one of the multiple number of RFID tags has been detected. Such indication can either be displayed on display 122 for example or be in the form of an LED display light.

Some of the advantages of using the harmonic value of an antenna signal will now be discussed in more detail.

Figure 3:
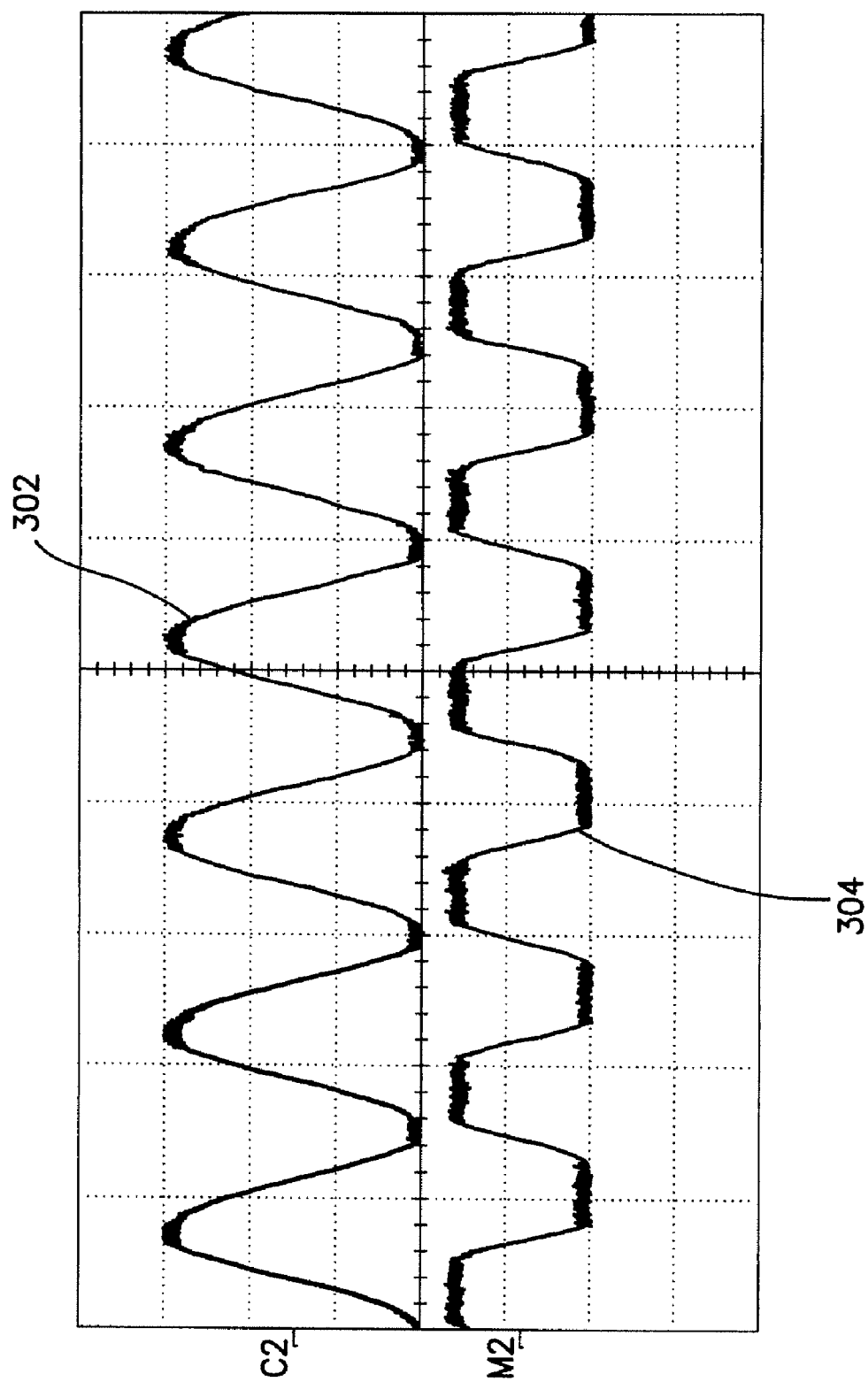
FIG. 3 is a graph showing the benefits of the use of harmonics according to one embodiment of the present invention.

As is known in the art, monitoring using harmonics diminishes background noise level by reducing the bandwidth of the signal which results in a non-sinusoidal wave form. Typically, when a sinusoidal voltage is passed through a transformer, the current drawn by the transformer is proportional to the voltage applied. As can be seen in FIG. 3, if a transformer is tuned near 134.2 KHz, it results in a sine wave 302 which in one example has approximately a 300 volt difference between the peaks of the wave. Conversely, if a transformer is tuned to read the 3rd harmonic of the same signal, it results in a non-sinusoidal wave form 304 that is more close to a square wave and the distance between the peaks of the wave in the above example is reduced to approximately 160 volts. Thus, where harmonics are utilized, the voltage is decreased which creates the benefit of reducing the amount of high voltage parts necessary to manage such signal. Accordingly, the use of signal coupling transformer 116 which is tuned to read the antenna signal and filter out all of the signal except for the harmonic, provides an output with a lower voltage that can be more easily and efficiently processed by micro controller 110.

Figure 4:
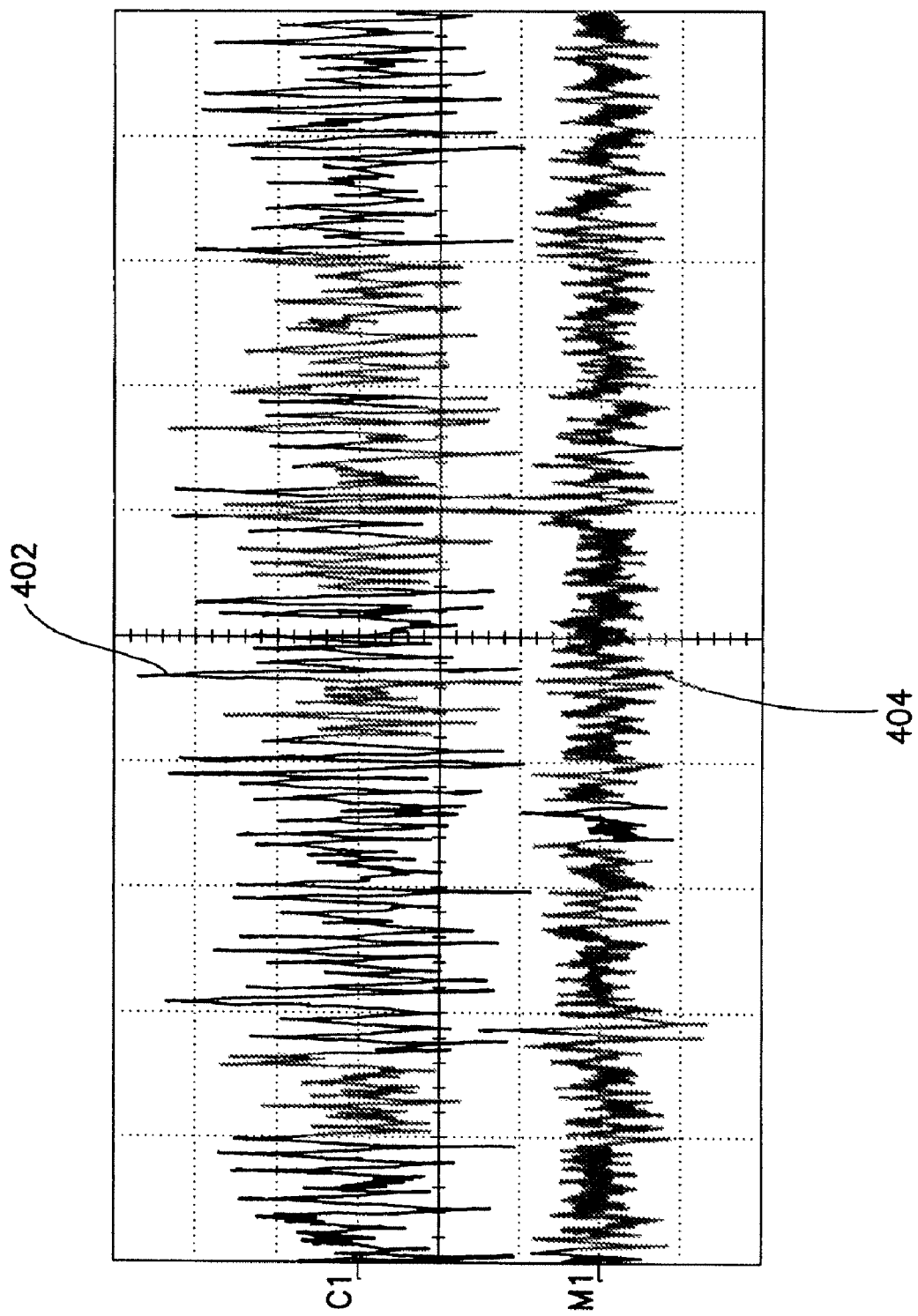
FIG. 4 is a graph showing the benefits of the use of harmonics according to one embodiment of the present invention.

Additionally as can be seen in FIG. 4 (which graph shows amplified noise measurements), the use of harmonics decreases the noise level of a signal and eliminates noise waves that would have the potential to interfere with other signals. For example if a transformer is tuned near 134.2 KHz, it has the potential to produce noise levels 402 as shown in FIG. 4. Conversely, if a transformer is tuned to 402.6 KHz (the 3rd harmonic), the resulting noise levels 404 are two times less or approximately 6 db less than when the 3rd harmonic is not utilized. Thus, where harmonics are exploited, the noise level is decreased and the reduced background noise makes it easier to monitor and read a signal. Accordingly, the use of signal coupling transformer 116 which is tuned to read the antenna signal and filter out all of the signal except for the harmonic, allows reader 100 to read the RFID signal with a reduced amount of ambient or background noise that could otherwise interfere with such reading.

Figure 5A:
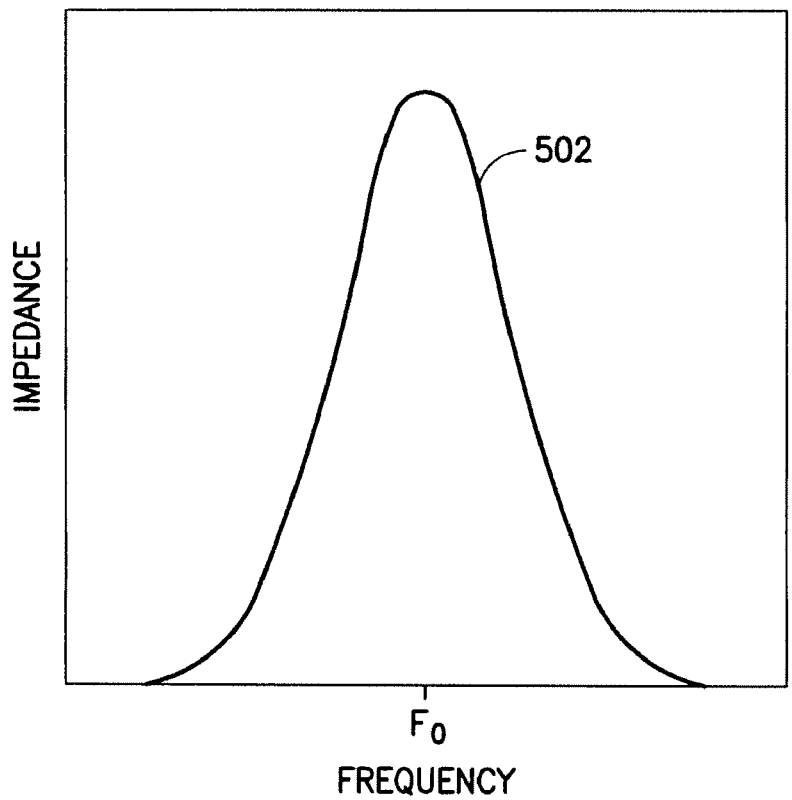
FIGS. 5A and 5B are graphs showing the benefits of the use of harmonics according to one embodiment of the present invention.
Figure 5B:
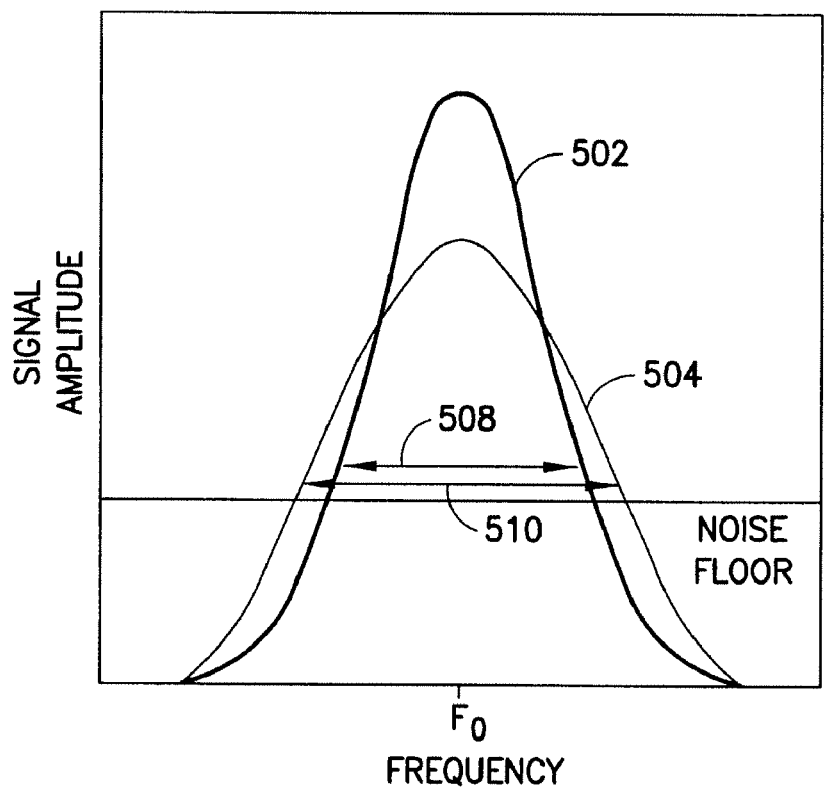

Moreover, as can be more clearly seen in FIG. 5A, when the frequency of a signal that is inputted into signal coupling transformer 116 increases, the impedance of signal coupling transformer 116 increases up to the resonance frequency $F_0$ and then decreases. As is known in the art, an increase in impedance creates a higher Q factor which indicates a lower rate of energy dissipation relative to the frequency. As can be seen in FIG. 5B, comparing graph 502 which is generated by a filter circuit with a higher Q frequency and graph 504 which is generated by a signal with a lower Q, it can be seen that the filter circuit signal with the higher Q value has a greater reduction in noise interference. Graph 502 results in a much narrower bandwidth 508 at the noise floor due to its higher Q factor, while graph 504 results in a larger bandwidth 510 at the noise floor which is indicative of a lower Q factor and hence more interference. Thus, in one embodiment of the present invention, when the antenna signal is read at its 3rd harmonic by signal coupling transformer 116, this enables reader 100 to read the signal coming from the RFID tag with less noise which in turn increases the range of such reader. When signal coupling transformer 116 more effectively filters out the antenna's signal other than a particular harmonic, it reduces the background noise and allows the reader to recognize RFID tags at a greater distance and with more accuracy.

As will be appreciated by one of ordinary skill in the art, the benefit of signal recovery at a higher frequency such as a third harmonic in reader 100 reduces the load that signal coupling transformer 116 has on antenna 112. Since signal coupling transformer 116 has such a minimal effect on antenna 112, the Q factor of signal coupling transformer 116 can be increased to a high value which as discussed above reduces the noise level and improves reception. With the high Q factor and the frequency separation between the returned signal and the RFID tag frequency, the signal coupling transformer 116 can be tuned for optimal signal recovery that allows antenna 112 to have a higher Q factor resulting in a more efficient reader.

The use of the bank of capacitors 114 will now be discussed in greater detail.

As is known in the art, the use of capacitors in an electrical circuit allows the adjustment of the capacitance level of such circuit. In reader 100, during the auto tune process, the bank of capacitors 114 are adjusted to determine the optimal capacitance setting for the best reader efficiency. In one embodiment, if bank of capacitors 114 contains 6 capacitors, the capacitor control unit 120 is able to adjust such capacitors to create $2^6$ different capacitor values. At start-up of the reader, for example, all of the capacitors can be deactivated or turned off. When micro controller 110 sends a signal to capacitor control unit 120 to adjust the capacitors, a single capacitor is turned on and the antenna signal which has now changed is once again fed into the signal coupling transformer 116 which feeds the harmonic value of such signal to micro controller 110 where the value is stored and the capacitor control unit 120 is sent a signal to turn off a second capacitor. This results in a change once again to the antenna signal and the process continues until all $2^6$ different capacitor combinations have been tried. As mentioned above, it should be appreciated that the adjustment of the capacitors adjusts the level of current which is fed from current monitor 104 into micro controller 110 as well. Once all of the capacitor combinations have been tested, the micro controller 110 determines which capacitor combination resulted in the optimal level of current and phase signal and sends a signal to capacitor control unit 120 to adjust the capacitors accordingly.

It should be appreciated that while the above embodiment was discussed in terms of a bank of six capacitors, it is contemplated that any number of capacitors in any combination can be used. Additionally, although the adjustment of the capacitors was discussed above in terms of adjusting capacitors on a one by one basis at the time that the reader is started up, this process can take place at anytime including at a periodic interval (e.g., hourly, once a day) or can consist of attempting only certain capacitor combinations to arrive at a certain range of capacitance.

Although the present invention and its advantages have been described in detail, it should be understood that various changes, substitutions and alterations can be made herein without departing from the spirit and scope of the invention. Moreover, the scope of the present application is not intended to be limited to the particular embodiments of the process, the assembly, operation, manufacture, composition of matter, means, methods, components and steps described in the specification. As one of ordinary skill in the art will readily appreciate from the disclosure, processes, components, means, methods, or steps, presently existing or later to be developed that perform substantially the same as the corresponding embodiments described herein may be utilized and are intended to be covered. It will be understood that omissions and substitutions and changes in the form and details of the disclosed invention may be made by those skilled in the art without departing from the spirit of the invention. It is the intention, therefore, to be limited only as indicated by the scope of the claims appended hereto.

The invention claimed is:

1. An automatic tuning reading device for communicating with a receiver comprising:
   a current monitor for monitoring the current received from a power supply of the reading device;
   an antenna driver;

one or more capacitors in communication with the antenna driver;
one or more switches for controlling the one or more capacitors;
a processor with a memory component;
an antenna in communication with the one or more capacitors via a transmission path; and 3
a signal coupling transformer;
wherein the capacitors are adjusted along the transmission path and the signal coupling transformer extracts the harmonic level of an antenna signal retrieved from the antenna, outputs the phase signal of the extracted harmonic level to the processor and the processor stores data related to such phase signal and data related to the monitored current in said memory and sends a signal to the one or more switches to adjust the one or more capacitors to automatically tune the antenna based on the stored data.

2. The reading device of claim 1 further comprising a display component.

3. The reading device of claim 1 wherein the processor sends a signal to the one or more switches to circle through multiple capacitor combinations before sending a signal to adjust the one or more capacitors to automatically tune the antenna.

4. The reading device of claim 1 further comprising an amplifier.

5. The reading device of claim 4 wherein the signal coupling transformer receives a signal from the antenna and outputs said received signal to the amplifier and the amplified signal is outputted to the processor.

6. The reading device of claim 1 wherein the signal coupling transformer is tuned between 280 and 500 KHz.

7. The reading device of claim 1 wherein the harmonic that is extracted by the signal coupling transformer is at or near the 3rd harmonic.

8. The reading device of claim 1 wherein the signal coupling transformer has a high Q factor.

9. The reading device of claim 8 wherein the antenna has a high Q factor.

10. A method of automatically tuning a reading device having an antenna and a processor comprising:
supplying power to the reading device;
monitoring the power supply;
storing data related to the monitored power supply in a memory component of the processor;
emitting a signal from the antenna;
receiving the antenna signal in a signal coupling transformer;
extracting a harmonic of the antenna signal in the signal coupling transformer;
outputting the phase signal of the extracted harmonic to the processor;
storing data related to the phase signal in a memory component of the processor;
adjusting capacitors that are in communication with the antenna via a transmission path; and
tuning the antenna to an optimal setting based on the data stored in the processor.

11. The method of claim 10 further comprising:
receiving a harmonic signal from the antenna;
amplifying the signal received from the antenna;
outputting the amplified signal to the processor;
generating a display on the reading device indicative of the signal received from the antenna.

12. The method of claim 10 wherein the harmonic is at or near the third harmonic.

13. The reading device of claim 1 wherein the harmonic that is extracted by the signal coupling transformer is at or near the 4th harmonic.

14. The reading device of claim 1 wherein the harmonic that is extracted by the signal coupling transformer is at or near the 5th harmonic.

15. The method of claim 10 wherein the harmonic is at or near the fourth harmonic.

16. The method of claim 10 wherein the harmonic is at or near the fifth harmonic.

* * * * *